(12) United States Patent
Agema et al.

(10) Patent No.: US 11,906,158 B2
(45) Date of Patent: Feb. 20, 2024

(54) HIGH PRESSURE HEATING INSTALLATION COMPRISING AN ADVANCED PANEL DESIGN AND CLADDING THEREOF

(71) Applicant: Amsterdam Waste Environmental Consultancy & Technology B.V., Amsterdam (NL)

(72) Inventors: Sietse Anne Agema, Amsterdam (NL); Marcellus Antonius Jozef Van Berlo, Amsterdam (NL)

(73) Assignee: AMSTERDAM WASTE ENVIRONMENTAL CONSULTANCY & TECHNOLOGY B.V., Amsterdam (NL)

( * ) Notice: Subject to any disclaimer, the term of this patent is extended or adjusted under 35 U.S.C. 154(b) by 310 days.

(21) Appl. No.: 17/267,426

(22) PCT Filed: Jul. 29, 2019

(86) PCT No.: PCT/NL2019/050502
§ 371 (c)(1),
(2) Date: Feb. 9, 2021

(87) PCT Pub. No.: WO2020/032789
PCT Pub. Date: Feb. 13, 2020

(65) Prior Publication Data
US 2021/0325035 A1    Oct. 21, 2021

(30) Foreign Application Priority Data

Aug. 9, 2018 (NL) ...................... 2021445

(51) Int. Cl.
| F22B 37/10 | (2006.01) |
| F23M 5/00 | (2006.01) |
| F23M 5/08 | (2006.01) |

(52) U.S. Cl.
CPC .............. *F22B 37/108* (2013.01); *F23M 5/08* (2013.01); *F23M 2900/05001* (2013.01); *F23M 2900/05004* (2013.01)

(58) Field of Classification Search
CPC .......... F22B 37/108; F22B 17/10; G21F 9/14; G21F 9/32; F23M 5/00; F23M 2900/05001; F23M 2900/05004
See application file for complete search history.

(56) References Cited

U.S. PATENT DOCUMENTS 3,139,866 A    7/1964  Gunther et al.
3,404,663 A *  10/1968  Lewis ................... F22B 37/025
                                                           122/367.1
(Continued)

FOREIGN PATENT DOCUMENTS

CH     714933 A2 * 10/2019 ............ F22B 37/108
CH     699405 B1 *  6/2021 ............ F22B 37/108
(Continued)

*Primary Examiner* — Gregory A Wilson
(74) *Attorney, Agent, or Firm* — AEON Law, PLLC; Adam L. K. Philipp; David Cohen

(57) ABSTRACT

The present invention is in the field of a high pressure heating installation and in particular a waste incineration installation comprising an advanced panel design and cladding thereof. Said cladding relates to a cladding to a in particular at least partly curved surface of a membrane panel, which panel is used in a high temperature and high pressure incinerator, such as a waste incinerator.

19 Claims, 5 Drawing Sheets

(56) References Cited

U.S. PATENT DOCUMENTS

| | | | | |
|---|---|---|---|---|
| 4,033,297 | A * | 7/1977 | Moreau | F22B 37/107 110/325 |
| 4,838,212 | A * | 6/1989 | Gaskin | F22G 3/008 122/476 |
| 5,687,676 | A * | 11/1997 | Kai | F22B 29/065 122/6 A |
| 7,204,061 | B2 * | 4/2007 | Terabe | F22B 37/108 122/511 |
| 8,518,496 | B2 * | 8/2013 | Seitz | F22B 37/107 427/456 |
| 2007/0144631 | A1 * | 6/2007 | Clavenna | C21D 10/00 148/558 |
| 2008/0163792 | A1 * | 7/2008 | Seitz | C23C 4/04 427/456 |
| 2015/0128881 | A1 * | 5/2015 | Nance | B23K 26/26 29/890.051 |
| 2015/0167960 | A1 * | 6/2015 | Borek | B23K 26/342 29/890.051 |
| 2017/0299172 | A1 * | 10/2017 | Wells | F22B 29/062 |

FOREIGN PATENT DOCUMENTS

| | | | | |
|---|---|---|---|---|
| CN | 85108386 | A * | 9/1986 | F22B 1/025 |
| CZ | 302942 | B6 * | 1/2012 | F22B 31/003 |
| DE | 10257305 | A1 * | 6/2004 | F22B 31/045 |
| EP | 1164330 | A1 | 12/2001 | |
| EP | 1336808 | A1 * | 8/2003 | F22B 37/108 |
| EP | 1493968 | A2 | 1/2005 | |
| FR | 2307214 | B1 | 5/1982 | |
| GB | 557853 | A | 12/1943 | |
| NL | 1031002 | C2 | 7/2007 | |
| WO | 8602290 | A1 | 4/1986 | |
| WO | 2009064415 | A1 | 5/2009 | |
| WO | WO-2013180588 | A2 * | 12/2013 | B08B 17/00 |
| WO | 2013180588 | A3 | 1/2014 | |
| WO | WO-2016109903 | A1 * | 7/2016 | F22B 21/02 |

\* cited by examiner

HIGH PRESSURE HEATING INSTALLATION COMPRISING AN ADVANCED PANEL DESIGN AND CLADDING THEREOF

RELATED APPLICATIONS

This application is a U.S. National Phase of PCT Patent Application No. PCT/NL2019/050502 having International filing date of Jul. 29, 2019, which claims the benefit of priority of Dutch Patent Application No. 2021445 filed on Aug. 9, 2018. The entire contents of the above-referenced applications and of all priority documents referenced in the Application Data Sheet filed herewith are hereby incorporated by reference for all purposes.

FIELD AND BACKGROUND OF THE INVENTION

The present invention is in the field of a high pressure and high efficient heating installation and in particular a waste incineration installation comprising an advanced panel design and cladding thereof. Said cladding relates to a cladding of in particular an at least partly curved surface of a membrane panel, which panel is used in a high temperature and high pressure incinerator, such as a waste incinerator.

The present invention is in the field of a high pressure and high efficient heating installation and in particular a waste incineration installation and a method for applying a cladding thereto.

The present invention relates to a high pressure high temperature incinerator. A prior art incinerator typically comprises steam pipes of carbon steel or low alloy base tube material with a stainless steel coating being applied by means of helical welding. Subsequently the steam pipes may be assembled into a membrane wall by mutually welding the mutually parallel extending steam pipes with an inter fitted connection strip. By helical overlay-welding of the stainless steel (e.g. Inconel 625) a smooth surface may be obtained. For an optimized smooth result, the coat-welding of the steel may be carried out by MIG welding and TIG disposing.

By helical overlay-welding of stainless steel (e.g. Inconel 625) a smooth surface may be obtained for prior art applications.

Helical overlay-welding refers to succeeding windings of a weld bead that mutually contact or (slightly) overlap with adjacent longitudinal edges, such that a continuous coating of substantially constant thickness is aimed at.

A membrane wall is typically designed for a waste incinerator. The membrane wall serves as sideway limit of a fire space. In the fire space a temperature typically is from 700-1200° C. In view thereof the membrane wall is cooled by a liquid, typically water which may be in the form of steam in pipes of the membrane wall. The water/steam mixture runs through the steam pipes that typically extend upwards. Water and steam may subsequently be separated.

The overlay-welding and the connection strip preferably have a high corrosion and abrasive strength. In view thereof preferably use is made of stainless steel welding material to weld the connection strip to the steam pipe, preferably with a mutually substantially equal composition. Welding is in addition preferably carried out in a protective environment, e.g. below a powder cover, to avoid environmental attack of the welding material or surrounding steel.

Typically sizes of connection strips are found to be limited due to requirements thereof, such as uniform thickness, straightness, and smoothness.

Some prior art documents recite sophisticated claddings and incinerator designs, such as EP 1 493 968 A2, EP 1 164 330 A1 and NL 1031002, which contents are incorporated by reference.

Some further prior art documents indicate certain concepts of cladding. In particular WO 2013/180588 A2, FR 2 307 214 A1, GB 557 853 A, U.S. Pat. No. 3,139,866 A, WO 86/02290 A1, and WO 2009/064415 A1 can be mentioned. WO 2013/180588 A2 recites a method of applying a protective cladding by coupling of two gas-tight membranes together, and then soaking a pair of gas-tight membranes, afterwards, the membrane surface where a cladding is to be applied is cleaned and preheated, and then the cleaned and preheated surface of a pair of gas-tight membranes coupled together is covered with a protective cladding, wherein a protective cladding is applied at a thickness of 0.1 mm to 3.00 mm, and finally, gas-tight membranes with a cladding are uncoupled.

Waste incinerators are generally well known. Therein hot waste gases that are released by the incineration of the waste material are used to generate steam. The incinerator is equipped with a heat exchanger consisting of bundles of pipes through which steam is fed. The steam that is formed from the heat of the waste gases is fed to a heat exchanger for superheating, via a steam drum, which is a well-known technique. While the steam is generally superheated to a temperature of approximately 400° C., and a pressure of approximately 40 bars, whereas a number of installations apply higher temperatures and pressures.

The efficiency for large modern installations is typically limited by choices for a particular incineration process, construction of the boiler, and materials available for the harsh conditions generated by the furnace. A reason is that the flue gases generated by burning (waste) material that is used as "fuel" lead to corrosion in those parts of the installation that come into contact with the waste gases. The measures that are taken to combat this corrosion (low temperature of both the surface of the heat exchanger and the waste gases that come into contact with it) are at the cost of the total efficiency of the installation.

Incinerators are seldom operated at high temperatures for the steam produced (normally 380-420° C., seldom above 450° C., hardly ever above 520° C.) in combination with high pressures (normally 30-45*$10^2$ kPa, seldom above 70*$10^2$ kPa, hardly ever above 10*$10^3$ kPa), despite certain advantages thereof, such as for improving the efficiency of the production of electricity with the turbine in the water-steam cycle. For certain waste to energy incinerators it is required to operate for at least two seconds flue gas residence time at a temperature above 850° C. This requires a large volume of the furnace and correspondingly large surfaces of the furnace walls. A major issue with high pressure high temperature incinerators is that an expected lifetime of the incinerator and in particular of membranes thereof is short, mainly caused by physical and chemical incompatibilities of materials applied and environmental (boundary) conditions. It has been found that even sophisticated prior art claddings have difficulty in withstanding the operation conditions. It is noted that the membranes and pipes typically are in direct contact with hot and aggressive gases. On the other hand a good heat transfer is required, in view of efficiencies.

There is therefore a need for improved claddings and installations, especially claddings for a membrane panel, and a method for applying said cladding. It is an object of the present invention to provide a cladding which overcomes one or more of the above disadvantages, and a method of forming a cladding, which is specifically suited for a membrane panel, without jeopardizing functionality and advantages.

SUMMARY OF THE INVENTION

The present invention relates to an improved high pressure heating installation according to claim 1, which is a high pressure and high efficient heating installation and typically a waste incineration installation, preferably comprising an advanced panel design and cladding thereof. A typical heating installation is rectangular and may have at least four panels. Therein a specific NiCr cladding is provided for at least one panel of the heating installation. The material of the panel is selected from steel alloys, comprising 0.002-3 wt. % C, preferably 0.02-2.5 wt. % C, more preferably 0.2-2.2 wt. % C, even more preferably 0.5-2 wt. % C, and at least one metal selected from Mo, Mn, B, Ti, V, Nb, Cr, Al, Cu, Si, Co, W, and, Ni, in an amount of total metal of 0-10 wt. %, preferably 0.2-7.5 wt. %, more preferably 0.5-6 wt. %, even more preferably 1-5 wt. %. The present heating installation is adapted to operate under circumstances which are (still) considered at least undesirable if not impossible, namely a high water/steam pressure from $3*10^3$ kPa-$30*10^3$ kPa (30-300 atm.) in combination with a flue gas temperature of 850-1700 K, preferably $5*10^3$ kPa-$25*10^3$ kPa, more preferably $7*10^3$ kPa-$20*10^3$ kPa, even more preferably $8*10^3$ kPa-17, $5*10^3$ kPa, such as 10-16, 5 $10^3$ kPa, e.g. 12, 5-15, 5 $10^3$ kPa, typically 1000-1450 K, such as 1250-1350 K, and exposure to chemical active species as gases formed by incinerating waste. The improved cladding and membranes obtained can be applied in high pressure heating installations in general. The present membrane panel comprises at least one tube and said NiCr cladding. The present tubes may be provided in a vertical direction, in a horizontal direction, under an angle in between vertical and horizontal, and combinations thereof; it is preferred to use vertical tubes. The NiCr alloy comprises >35 atom % Ni, preferably 37-67 atom %, more preferably 55-62 atom %, even more preferably 58-60 atom %, >18 atom % Cr, preferably 19-33 atom % Cr, more preferably 20-30 atom %, even more preferably 22-28 atom %, such as 23-27 atom %, 0-6 atom % Fe, preferably 0.1-4 atom %, more preferably 1-3 atom %, e.g. 1.5-2.5 atom %, 5-19 atom % Mo, preferably 1-17 atom %, more preferably 8-12 atom %, such as 9-11 atom %, 0-5 atom % Nb+Ta, preferably 2-4 atom %, more preferably 3-3.5 atom %, such as 0.1-3.5 Nb atom %, preferably 0.2-3.0 Nb atom %, more preferably 0.5-2.0 Nb atom %, such as 1.4-1.8 Nb atom %, preferably 0.2-3.0 Ta atom %, more preferably 0.5-2.0 Ta atom %, such as 0.7-1.8 Ta atom %, and 0-5 atom % of at least one of C, Mn, Si, P, S, Al, Ti and Co, such as 0-0.2 atom % C, e.g. 0.01-0.1 atom % C, such as 0-1 atom % Mn, such as 0.1-0.75 atom % Mn, such as 0-1 atom % Si, e.g. 0.01-0.2 atom % Si, such as 0-0.5 atom % P, e.g. 0.01-0.2 atom % P, such as 0-0.5 atom % S, e.g. 0.01-0.1 atom %, such as 0-1 atom % Al, e.g. 0.01-0.5 atom % Al, such as 0-1 atom % Ti, e.g. 0.01-0.5 atom % Ti, such as 0.02-0.3 atom % Ti, such as 0-5 atom % W, e.g. 1-4.5 atom % W, such as 2-3 atom % W, such as 0-1 atom % Cu, e.g. 0.01-0.5 atom % Cu, such as 0.02-0.3 atom % Cu, and such as 0-2 atom % Co, e.g. 0.01-1.3 atom % Co, such as 0.01-1.0 atom % Co. These claddings may already be considered as high quality and special purpose claddings. In addition to the strict and severe chemical-physical requirements of the cladding it has now been found that in order to reduce a mean time between failure (MTBF) to more than 1 year, and typically to more than 2 years, and in addition to increase an up-time to more than 80%, typically more than 90%, such as more than 95%, an even more sophisticated and advanced cladding is required, namely a cladding which, after being applied, has at least one of a surface roughness (Ra) of <60 μm, preferably <40 μm, such as ≤35 μm (DIN 25410), a surface purity (SA) of ≥2.0, preferably ≥2.5, more preferably ≥3.0 (ISO 8501-1), a thickness of 1.5-10 mm, preferably 2.0-5 mm, such as 2.5-4 mm, over at least 50% of the cladded area, preferably over >70% cladded area, more preferably over >90% cladded area, such as 95-100% of cladded area (Fischer Deltascope FMP 10, head FJB2), typically measured according to standard or at 25° C. Such relates to a very smooth surface of the cladding, a very good purity of the surface, and a good thickness, which characteristics have been found difficult to achieve. Thereto a very strict method of applying the cladding may be required, said method being detailed below. Said cladding is found to function well under the extreme conditions of the high pressure heating installation, and can withstand chemically aggressive components typically being present in flue gases for a long time. The exemplary embodiments of the present invention are considered to contribute to the above effects as well.

When relative percentages are used, such as wt. %, it is noted that a wt. % is calculated either based on a total composition or, if indicated specifically, on a constituent, etc.

In view of heat transfer the membranes of an incinerator are preferably constructed and provided in the figures. Therein pipes of a membrane are coupled thermally. Examples thereof are given in any of FIGS. 1-12. Thereby the present invention provides a solution to one or more of the above mentioned problems.

In a second aspect the present invention relates to a membrane panel for a heating installation, such as a waste incineration system or a biomass incineration system, of which the details are provided throughout the description. The features exemplified in the claims can be combined equally to the present membrane panel per se.

Advantages of the present description are detailed throughout the description. The teachings and examples of the present invention may be combined into a further not specifically disclosed exemplary embodiment.

DETAILED DESCRIPTION OF THE INVENTION

In a first aspect the invention relates to a high pressure heating installation according to claim 1.

In an exemplary embodiment of the present high pressure heating installation the material of the panel is selected from steel alloys, comprising 0.002-3 wt. % C, and at least one metal selected from Mo, Mn, B, Ti, V, Nb, Cr, Al, Cu, Si, Co, W, and, Ni, in an amount of total metal of 0-10 wt. %, preferably 0.1-2.5 wt. % Mo, more preferably 0.2-1.5 wt. % Mo, even more preferably 0.4-1.2 wt. % Mo, preferably 0.05-1.5 wt. % Mn, more preferably 0.1-1.1 wt. % Mn, even more preferably 0.2-0.8 wt. % Mn, preferably 0.1-2.5 wt. % B, more preferably 0.2-1.5 wt. % B, even more preferably 0.4-1.2 wt. % B, preferably 0.1-2.5 wt. % Ti, more preferably 0.2-1.5 wt. % Ti, even more preferably 0.4-1.2 wt. % Ti, preferably 0.1-2 wt. % V, more preferably 0.2-1.5 wt. % V, even more preferably 0.4-1 wt. % V, preferably 0.1-3.5 wt. % Nb, more preferably 0.2-2.5 wt. % Nb, even more preferably 0.4-2 wt. % Nb, preferably 0.1-4.5 wt. % Cr, more preferably 0.2-3.5 wt. % Cr, even more preferably 0.4-2.2 wt. % Cr, preferably 0.1-2.5 wt. % Al, more preferably 0.2-1.5 wt. % Al, even more preferably 0.4-1.2 wt. % Al, preferably 0.1-2.5 wt. % Cu, more preferably 0.2-1.5 wt. % Cu, even more preferably 0.4-1.2 wt. % Cu, preferably 0.1-2.5 wt. % Si, more preferably 0.2-1.5 wt. % Si, even more preferably 0.4-1.2 wt. % Si, preferably 0.1-3.5 wt. % Co, more preferably 0.2-2.5 wt. % Co, even more preferably 0.4-2 wt. % Co, preferably 0.1-2.5 wt. % W, more preferably 0.2-1.5 wt. % W, even more preferably 0.4-1.2 wt. % W, and preferably 0.1-5 wt. % Ni, more preferably 0.4-3.5 wt. % Ni, even more preferably 1-2.2 wt. % Ni.

In an exemplary embodiment of the present high pressure heating installation the membrane panel comprises at least one tube, preferably wherein the panel comprises two or more adjacent tubes, and optionally a strip in between two adjacent tubes. In view of improved heat transfer the present panels are provided. It is noted that the tubes add to a complexity of the present installation in terms of manufacture thereof, and specifically in applying a cladding. Especially structures are found difficult to clad in a reliable manner. In between tubes typically strips with a width are provided. The width may be varied over the present heating installation, as well as a diameter of the tubes used.

In an exemplary embodiment of the present high pressure heating installation a longitudinal curvature of a membrane panel is <10 mm/3000 mm, preferably <5 mm/3000 mm. It has been found important to minimize a curvature, such as in view of stress induced to welded membrane panels that may occur otherwise. Also when constructing an installation membrane panels are typically welded together; in order to prevent stress sizes of adjacent panels need be within rather strict boundary conditions.

In an exemplary embodiment of the present high pressure heating installation the longitudinal curvature of a strip <1 mm/1000 mm. Also the strip curvature is preferably as small as possible. It has been found important to minimize a curvature, such as in view of stress induced to welded membrane panels that may occur otherwise. Also when constructing an installation membrane panels are typically welded together; in order to prevent stress sizes of adjacent panels need be within rather strict boundary conditions.

The membrane panels are typically not stiff enough in a direction perpendicular to the tubes. The forces from boiler construction and the under pressure in the furnace concentrate on a bending in the middle of the strip where possibly stress corrosion is induced in the cladding. In an exemplary embodiment at least one rear side support is provided to keep the panels flat and avoid bending stress in the strip possibly leading to stress.

In an exemplary embodiment of the present high pressure heating installation wherein a weld comprises <10 wt. % Fe, preferably <6 wt. % Fe, such as <4 wt. % Fe (spectral analysis PMI). In view of durability it has been found that a Fe content of the weld is preferably not too high, as identified here. It has been found that in order to reduce corrosion and stress the Fe content is preferably rather small.

In an exemplary embodiment of the present high pressure heating installation having at least one flat wall, i.e. a part of the installation without tubes. In view of durability it has been found that an amount of tubes is preferably not too high. It has been found that in order to reduce corrosion and stress the number of tubes is preferably rather small. It is noted that in view of heat transfer and power generation only a limited number of walls are provided without tubes.

In an exemplary embodiment of the present high pressure heating installation wherein a/the tube has a diameter of 5-20 cm, and a variation in diameter (over an angle of 90°) of less than 2%, preferably less than 1%, relative to the diameter.

It has been found important to check for a variation in tube diameter, such as in view of stress. Stress may be released by annealing or the like. Also when constructing an installation membrane panels are typically welded together; in order to prevent incompatibilities between tube diameters need be within rather strict boundary conditions.

In an exemplary embodiment the present high pressure heating installation has a membrane panel constructed according to any of FIGS. 1-12, typically at least a few of said panels. These type of panels are found to provide a good heat transfer.

In an exemplary embodiment the present high pressure heating installation comprises at least two parallel tubes coupled to a plate element, wherein the tube and plate are thermally coupled. Typically a plate element is provided that couples a number of tubes, such as one plate per membrane panel. The plate element can be provided in addition to the present strips. The plate element can be provided on all of the membrane panels of the present heating installation, or on part thereof, such as on the membrane panels exposed to a relative high temperature, such as >800° C.

In an exemplary embodiment of the present high pressure heating installation a space between tubes is filled with a thermal conducting material, such as copper, aluminium, silver, and lead. Therewith an improved heat transfer is provided.

In an exemplary embodiment of the present high pressure heating installation, over a longitudinal direction of the membrane, tubes have a variation in diameter over a circumference of <1% relative to an average diameter. In view of providing good welds, reducing stress, providing a good fit between membranes, and a good heat transfer such tubes are preferred.

In an exemplary embodiment of the present high pressure heating installation a variation in width of the membrane panel is <2 mm/m length with a maximum of 10 mm, such as <1 mm/m.

In an exemplary embodiment of the present high pressure heating installation, over a longitudinal direction of the membrane, a variation in length of the membrane panel is <2 mm/m width with a maximum of 10 mm.

In an exemplary embodiment of the present high pressure heating installation, over a longitudinal direction of the membrane, a variation in length of the membrane panel is <2 mm/m width with a maximum of 10 mm. In an exemplary embodiment of the present high pressure heating installation a curvature of the membrane panel is <6 mm/m. The small variations in width and length provide a low stress, and good thermal properties. With the above strict dimensional requirements a durable installation can be built which can withstand the extreme conditions thereof over time.

In an exemplary embodiment of the present high pressure heating installation a width of the panel is from 20-1200 cm, preferably 40-500 cm, such as 60-300 cm, and a length is from 20-2500 cm, preferably 40-1500 cm, such as 60-500 cm. The panels may be as large as possible.

In an exemplary embodiment of the present high pressure heating installation a thickness of the panel is from 5-20 cm. In view of durability and heat transfer the panels may be rather thick, whereas in terms of operation they may be rather thin.

In FIG. 15 an exemplary embodiment comprises variation of strip width and pipe diameter for optimisation of performance for corrosion resistance and cost.

In an exemplary embodiment of the present high pressure heating installation a strip between two tubes has a width $s_2$ of 3-50 mm, preferably 5-40 mm, such as 18-33 mm. In view of cladding and extreme condition a strip is preferably not too wide nor too small. It is noted that in view of thermal properties a strip is preferably very small (i.e. a tube is as broad as possible), whereas in terms of stress the strip is preferably rather broad.

In an exemplary embodiment of the present high pressure heating installation a strip width $s_1$ of membrane panel "closest" to the incinerator is 1-35 mm, preferably 2-33 mm, such as 3-30 mm and preferably <25 mm. For these membranes even harsher conditions apply and it has been found that in view thereof a strip is preferably slightly smaller in width in order to provide the durable installation above.

In an exemplary embodiment of the present high pressure heating installation a tube diameter $d_2$ is 30-147 mm, preferably 40-100 mm, more preferably 45-70 mm, such as 50-60 mm. In an exemplary embodiment of the present high pressure heating installation a tube diameter $d_1$ "closest" to the hottest part of the furnace is 20-149 mm, preferably 30-100 mm, more preferably 40-70 mm, such as 50-57 mm and preferably over a length of 5-20 m, such as 10-15 m. It is preferred to have a large tube diameter and a smaller strip diameter closest the hottest parts of the furnace in view of the present characteristics. In an exemplary embodiment of the present high pressure heating installation a sum of the strip width and the tube width $s_{1,2}+w_{1,2}=20$-150 mm, preferably 25-100 mm, more preferably 30-75 mm, such as 35-50 mm, and is preferably constant over the installation, and preferably wherein $s_2<s_1$.

In an exemplary embodiment the present high pressure heating installation comprises an incinerator, adjacent to the incinerator a first area with refractory coated walls.

In an exemplary embodiment the present high pressure heating installation a strip comprises tapered sides at a longitudinal thereof. In view of welding and characteristics obtained after welding such is preferred. The tapered angle is preferable 10-70 degrees with respect to a horizontal plane of the strip, more preferably 20-60 degrees, such as 30-50 degrees. The angle is preferably not too high in view of welding, and not too small in view of characteristics obtained.

In an exemplary welding method the tubes and strips of the membrane wall are assembled by welding the mutually parallel extending steam pipes with an inter fitted connection strip and a stainless-steel coating being applied by means of linear overlay welding, covering the front side of the carbon steel pipes and preferably also carbon steel or stainless steel strips. The linear coatoverlay-welding refers to succeeding windings of a weld bead that mutually contact or (slightly) overlap with adjacent longitudinal edges, such that a continuous coating of substantially constant thickness is aimed at.

In an exemplary embodiment the present high pressure heating installation the cladding comprises a protective layer, such as selected from a passivation layer, a coating, and combinations thereof. Exemplary passivation layers relate to oxides, such as oxides and nitrides of Ni, Cr, Nb, Ta, Mn, Si, Al, Ti and Co, and combinations thereof. Coatings relate to aluminosilicates, such as clays, zeolites, and combinations thereof.

In an exemplary embodiment the present membrane a strip width of the panel increases from one membrane section to another membrane section, such as in a section close the incinerator to a section further away.

In an exemplary embodiment the present membrane a strip width increases from one membrane section to another membrane section, such as in a section close the incinerator to a section further away.

The invention is further detailed by the accompanying figures and examples, which are exemplary and explanatory of nature and are not limiting the scope of the invention. To the person skilled in the art it may be clear that many variants, being obvious or not, may be conceivable falling within the scope of protection, defined by the present claims.

The temperatures that are mentioned in this description relate to all temperatures for which a boiler is designed, in normal use and with a normal rate of contamination. A new boiler or a boiler that has just been cleaned, or a very dirty boiler that must be cleaned, will be able to work with other temperatures than those that are mentioned here.

BRIEF DESCRIPTION OF THE SEVERAL VIEWS OF THE DRAWINGS

FIGS. 1-12 show configurations of the present membrane.

DESCRIPTION OF SPECIFIC EMBODIMENTS OF THE INVENTION

Figure 1:
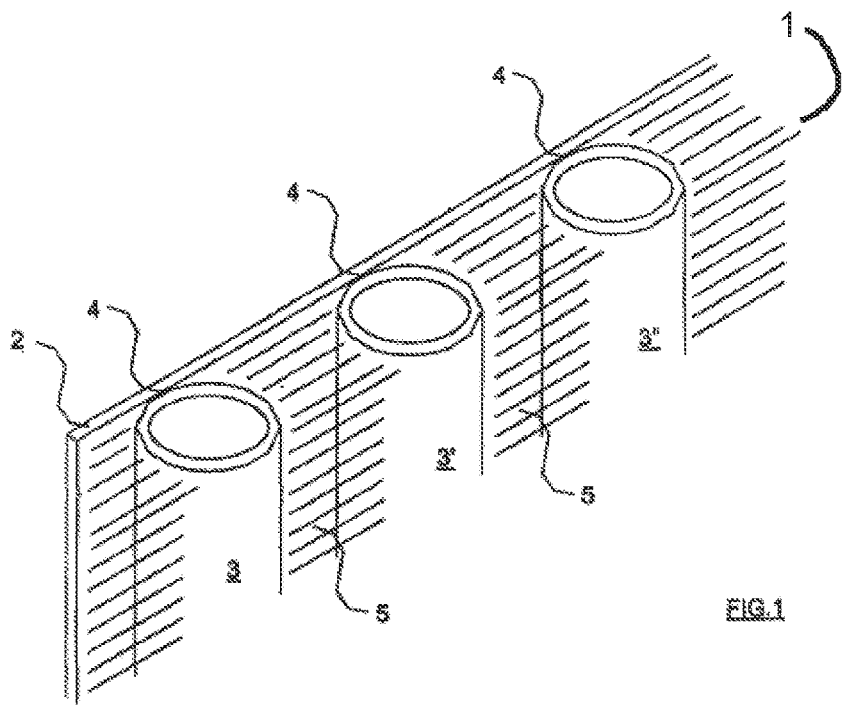
Figure 2:
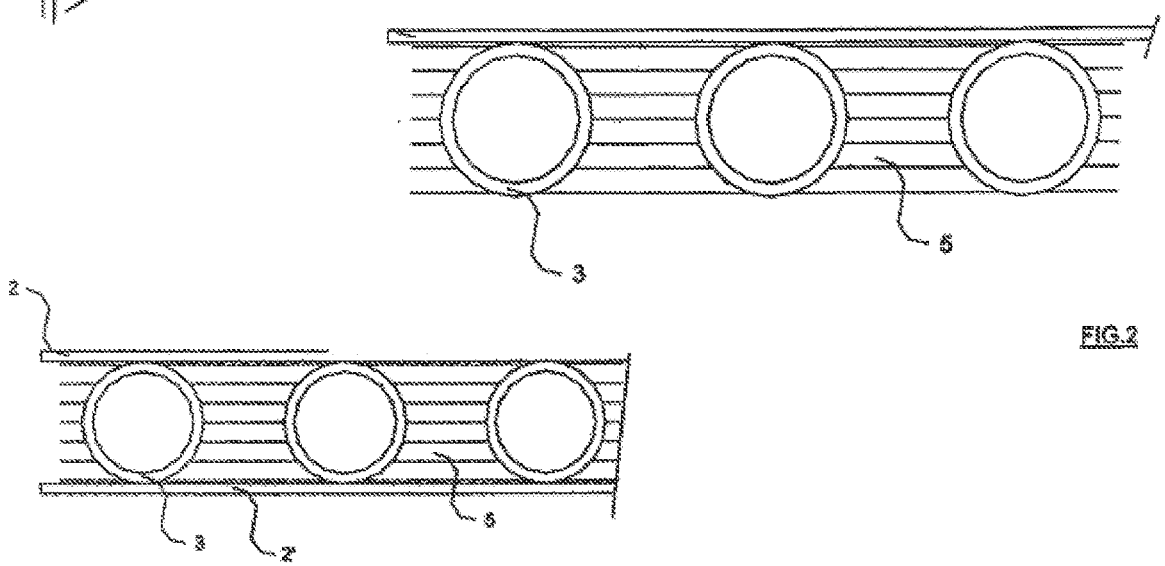
Figure 3:
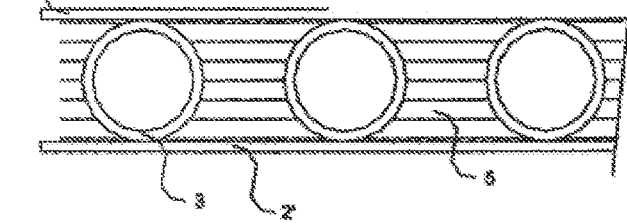
Figure 4:
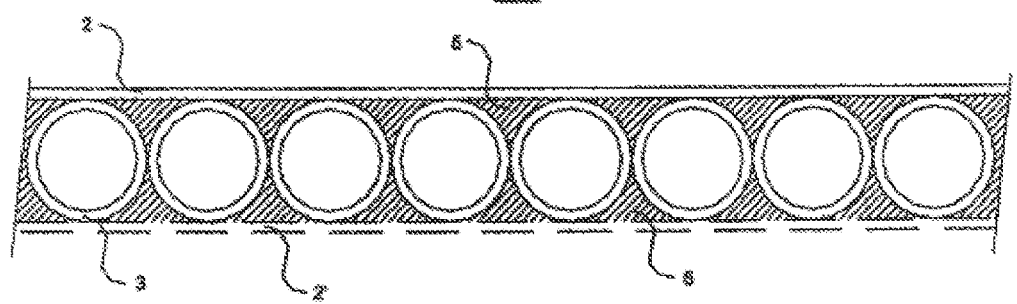
Figure 5:
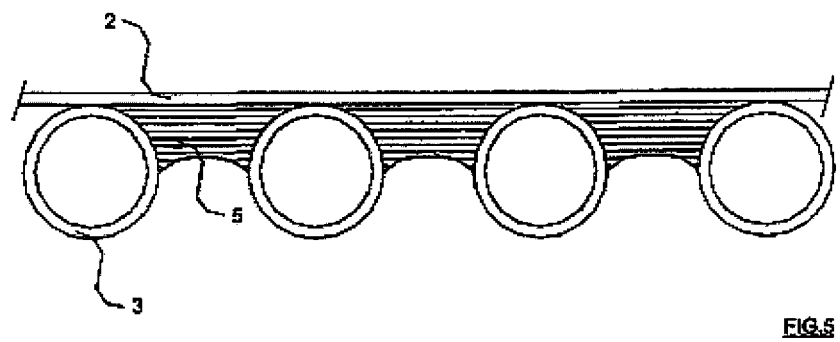
Figure 6:
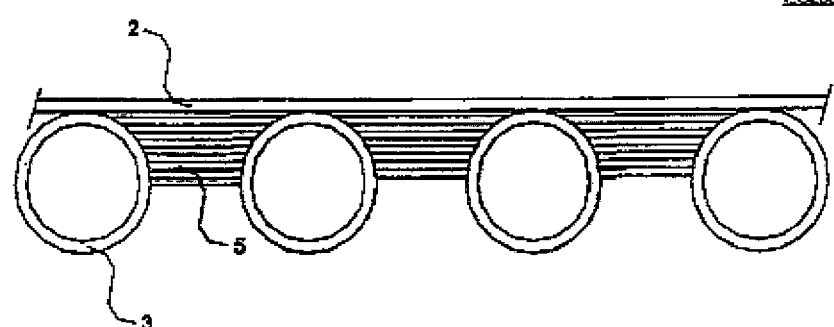
Figure 7:
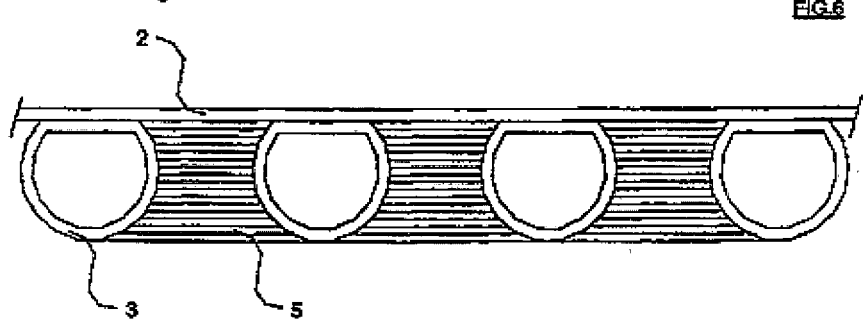
Figure 8:
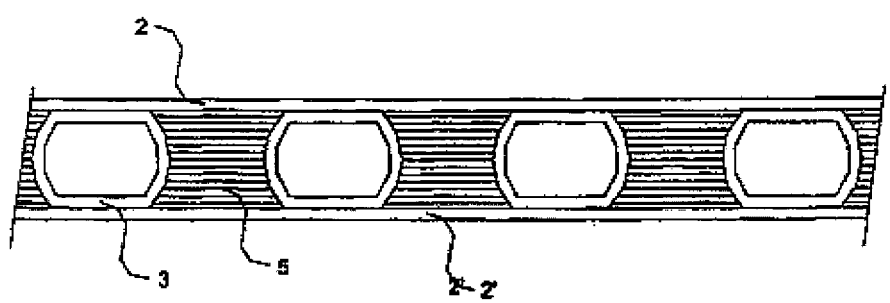
Figure 8:
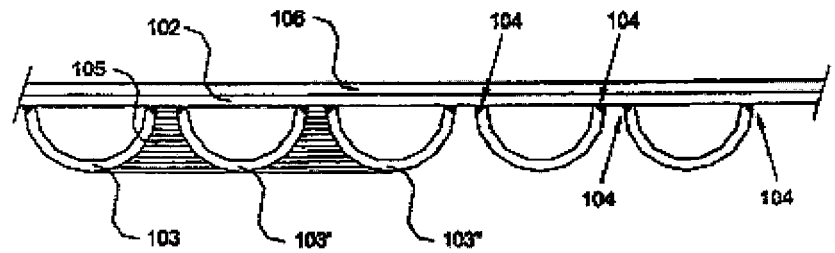
Figure 10:
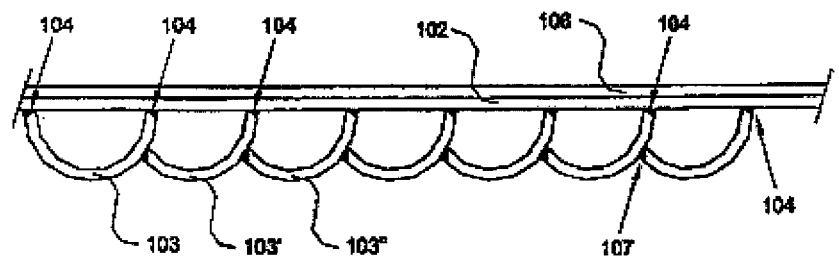
Figure 11:
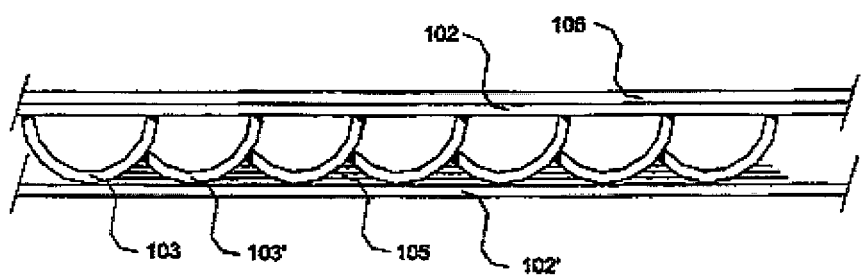
Figure 12:
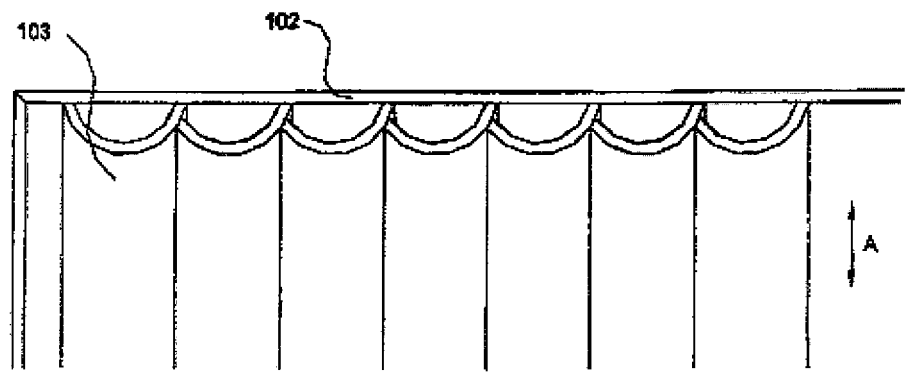

In the figures:
1 membrane wall
2,2',2" plate element
3,3',3" tube
5 thermal conducting material
7 small space
8 row of evaporation pipes
9 slag extraction
10-11 coarse boiler ash separation
12-14 fine boiler ash separation
15-21 heat exchange pipes
22 injection cooler
23 injection cooler
24 injection cooler
25 steam drum
26 first stage turbine
27 extra heat exchanger
28 second turbine stage
29 heat exchanger
71 first pass
72 second pass
73 third pass
74 heat exchanger
75 steam superheater
76 evaporation wall
85 heat exchanger
102,102' plate shaped element
103,103',103" arc-shaped longitudinal element
104 longitudinal side
105 fill material
106 cladding
107 second longitudinal side third pass angle
A longitudinal direction
A' main steam flow
B s steam flow
C reheated steam flow
D steam flow
$d_1$ diameter tube $d_2$ diameter tube
$d_s$ distance from common centerline of two adjacent tubes
E steam flow
$s_1$ strip width
$s_2$ strip width
X strip width+tube diameter (pitch)
$X_1$ first turbine stage
$X_2$ second turbine stage FIGS. 1-12 show configurations of the present membrane, wherein one or more plates are provided, optionally with a conducting material.

Figure 13:
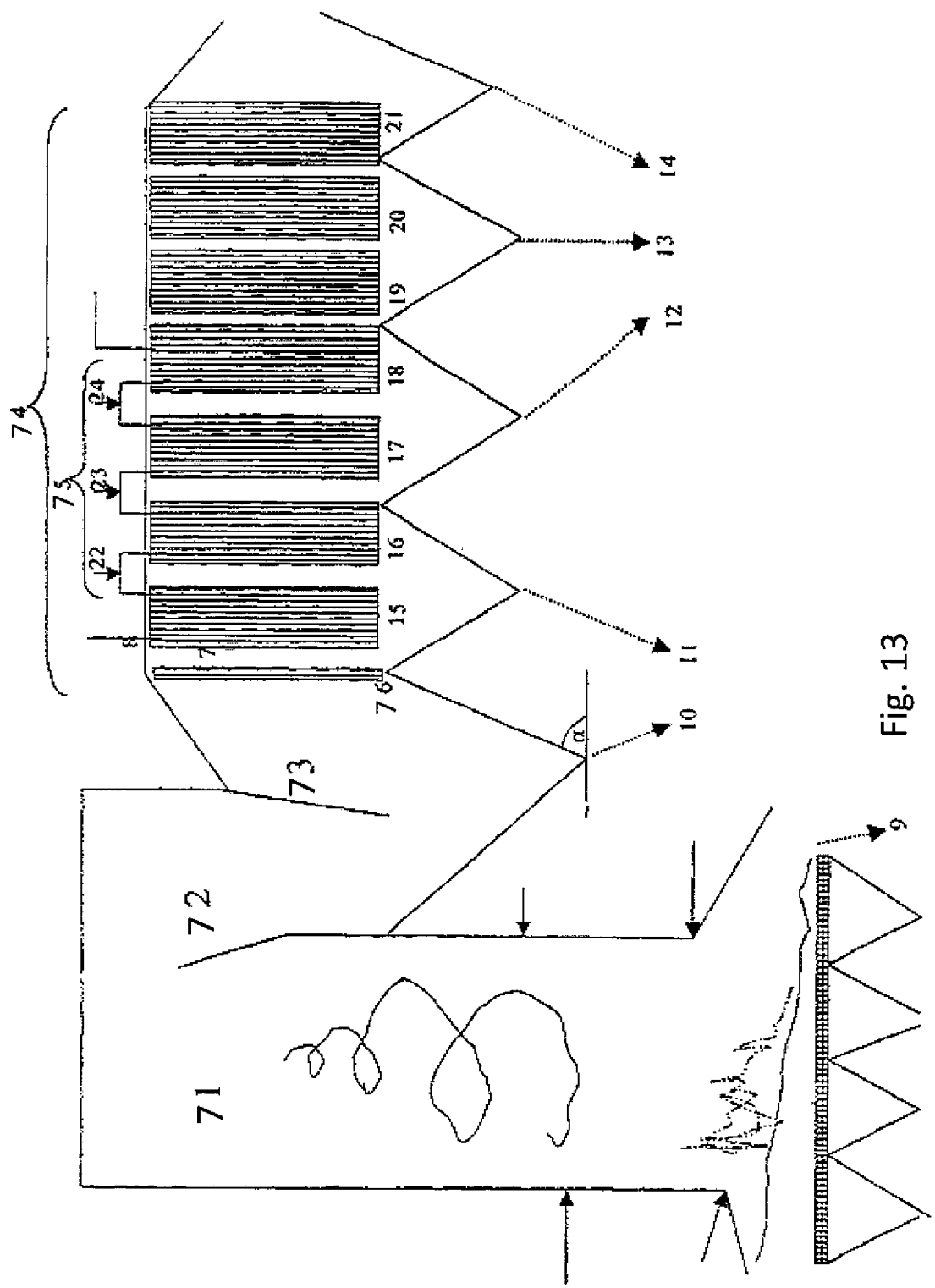
FIG. 13 shows an incinerator set-up.

FIG. 13 shows a schematic view of a waste incinerator plant. The flue gases are passed to a first pass 71, where they rise vertically and are then routed to a second pass 72, where the waste gases are passed downwards and routed to a third pass 73. The first pass is made out of a well-known membrane wall (not shown), among other things. In the highest part of the first pass 71 the waste gases are at a temperature lower than 900° C., preferably lower than 850° C. In addition, the speed of the waste gases in the first pass must be slower than 8 m/sec, preferably from 3 m/sec to 4 m/sec. In this way an equal temperature drop is achieved, wherein the amount of carbon monoxide can be lessened. Thereby it is also possible to carry out a reduction of nitrogen oxide using ammonia injection. The lowering of the maximum temperature in the upper part of the first pass can be achieved by making the first pass 71 higher, or by increasing its diameter. In any case the first pass 71 must be at least 15 meters high, and preferably from 20 to 25 meters high. This prevents the waste gases depositing a lot of parts on the walls, because in this case the possibility of deposits forming are minimal. From the point of view of flow technique, this does not result in any problems, provided provisions are made for a sufficient mixing of the waste gases. Among other ways, this can be achieved by the known technical method of supplying a secondary and a third gas. Because of the lower speed of the gases in the whole of the first pass, so also in the part directly above the flame front, significantly less boiler ash and fly ash is created.

The waste gases that leave the third pass 73 are then passed to a heat exchanger 74 in the form of a steam superheater (SSH) 75. In the form shown this SSH consists of four separate series of heat exchange pipes 15,16,17,18. Compared to known waste incinerator plants the temperature of the waste gases entering the SSH is relatively low here, namely in the range of approximately 600° C. to 670° C., and preferably limited to approximately 630° C. A so-called evaporation wall 76 is located at the start of the heat exchanger 74. This evaporation wall 76 has the function of making the flow of the waste gases to the heat exchanger 75 uniform. For this it is preferable that the evaporation wall 76 consists of two rows of evaporation pipes. Next to these two rows of evaporation pipes it is preferable to have a small space 7 on the other side of which one subsequent row of evaporation pipes 8 is located, after which the first rows of heat exchanger pipes 8 are located, in line with the pipes of the last row of evaporation pipes. The small open space 7 is preferably long enough that the waste gas speed across the entire diameter in this open space 7 can be smoothed out, wherein the speed of the flow of the gases is virtually the same in all places.

The evaporation wall 76 is technically a collecting point for fly ash, and a rapid cooling of the waste gases has a delaying effect on the nucleus of the parts of fly ash that are in the waste gases, wherein these remain at a temperature of more than 850° C. and are therefore still in the so-called 'sticky phase'. This means that the parts of fly ash, when they come into contact with the consecutive pipes of the evaporation wall, will stick to their surface. These parts of fly ash will also to a large extent stick to the heat exchanger pipes. Therefore, seeing that the sticky phase is achieved by temperatures of 850° C. and higher, it is preferable to lower the temperature of the waste gases in the second and third pass from 850° C. to 630° C. This can be achieved, for example, by decreasing the speed of the waste gases in the second and third pass. Furthermore, this decrease in the speed of the waste gases results in the boiler ash separation 10 being improved. This also has the result that the growth of contamination of the heat exchanger pipes is lessened. This growth in ash can be removed from the pipes using a technically well-known method. By separating the boiler ashes 10,11,12,13,14 thus removed into coarse 10,11, and fine ash 12,13,14, reuse of these boiler ashes is very well possible. The coarse boiler ash 10 especially contains few heavy metals and salts, and furthermore no dioxin (waste gas temperatures above 450° C. do not give off dioxin). The boiler ash 11 that is collected under the first part of the heat exchanger also meets this requirement. The fine boiler ash 12,13,14 is contaminated with dioxin, among other things.

The ash 12,13,14 that is passed out of the next parts of the heat exchanger contains larger amounts of contaminating material. Because the ashes so created are collected separately, the total amount of contaminated fly ash is lessened considerably.

Waste material that cannot be burnt (slag) is extracted at 9.

The transition from the vertical downward directional second pass to the upward directional slanting third pass can be optimized as far as flow techniques go by locating the third pass at an angle (α) from 30° to 70°, preferably from 50° to 65°. By using such an angle, the result is that the gases are fed to the heat exchanger without much loss in their kinetic energy, wherein an improved separation of fly gas is still achieved. Choosing an angle (α) not less than 45° results in the still somewhat sticky fly ash in the waste gases being easily transported over the wall and collected as boiler ash 10. The waste gases that are supplied to the heat exchanger 74 are at a temperature of from 600° C. to 700° C., approximately. In the case when the temperature of the waste gases is in the lowest part of this range, it is not necessary to use an evaporation wall for the purpose of lowering the temperature of the waste gases. If the waste gases are at a higher temperature, it is useful to use an evaporation wall to lower the temperature. The decrease in temperature as a result of this evaporation wall must, however, be limited to less than 30° C., so as not to negatively influence the efficiency of the boiler. As previously mentioned in this document, the evaporation wall especially serves to equalize the gas flow, and is therefore preferably always present in the construction.

The efficiency of the heat exchanger, which consists of the steam superheaters 15,16,17,18, generally indicated by SSH, can be increased by placing these superheaters in a contra-flow system. The first steam superheater 15, seen from the direction of the flow of the gases, must in that case be designed especially with a high steam speed in the pipe and low waste gas speed, to make sure that the surface temperature of the pipes remains low. Because this first SSH bundle is exposed to the highest temperature both on the steam side and the waste gas side, this first SSH will be the one under most load. It is therefore preferable to make the pipes of the first SSH of nickel chromium alloy. The temperature of the waste gases must hereby remain lower than 720° C., preferably lower than 670° C., for example from 600° C. to 670°

C., wherein the surface temperature of the nickel chromium alloy does not rise above 600° C. In practice this means that it is preferable that the evaporation wall 76 equalizes the flow, so that local high flow rates are avoided. The speed of the waste gases is preferably from 3 m/sec to 4 m/sec, wherein the surface temperature of the pipes remains lower than the temperature of the waste gases. For this it is preferable that the evaporation bundle 76 is installed across the entire width of gas flow at the heat exchanger 74. It is however possible to reduce the total number of pipes in the evaporation bundle 76, wherein the distance between each of the pipes will be from 20 to 50 centimeters. If more rows of evaporation walls 76 are used, then it is preferable that the pipes in each row are placed in the heat exchanger, in a staggered arrangement. In this case it is preferable that the pipes are placed parallel to each other. In this way an equal flow across the height and width of the waste gases is achieved, before these enter the superheater 15. As the first row of pipes in the first superheater 15 receive a free flow, it is preferable that these are constructed as evaporation pipes 8. The other pipes of the first SSH 15 are fitted next to each other, behind the evaporation pipes 8. The protection of the SSH pipes by the evaporation pipes is especially improved if the evaporation pipes are constructed with a diameter slightly larger than the SSH pipes that lie behind them (seen in the direction of flow of the waste gases). In another preferred variation the superheater pipes are constructed in a slightly oval shape wherein the smallest diameter is transverse to the direction of the flow of the waste gases. In this way wear on the pipes as a result of erosion by fly ash in the waste gases is lessened. The well-known technical method wherein the growth of fly ash on the SSH pipes is continually removed, by making the SSH pipes vibrate (for example by hitting the headers in which the pipes with their extremities are installed with a mechanical or pneumatic hammer), can be considerably improved by designing the SSH pipes such, that these have natural frequencies which are different in respective cross-section directions, as a result of the differences in stiffness resulting from the fact that pipes are not exactly round. By now vibrating the header at such specific natural frequencies, one can manage the removal of the fly ash deposits that have accumulated. By tuning each of the natural frequencies of the pipes to each other well (all the same), a limited amount of energy is required to obtain a maximum result. If this is difficult, because the attached mass of fly ash accumulations differs too much, it is also possible to give each of the SSH pipes its own natural frequency (and this will also be different for the various vibration directions) so that it is possible to resonate the pipes separately. Therefore the preference is for a system in which the oval pipes each have their own specifically chosen natural frequency, which can be used to make the pipes resonate by a well-chosen (tunable) excitation system.

At the second bundle 16 of the heat exchanger, or the second SSH 16, the waste gas flow is already equally distributed, a considerable amount of dust is already separated out, and furthermore the temperature of the waste gases is lowered. After this first SSH the speed of the waste gases can be increased, either by making the boiler smaller, which can be done in steps or in a gradual manner, or by increasing the number of pipes for each surface unit. In addition, it is possible to combine both forms of construction. Depending on the number of SSH superheaters 15,16, 17,18 that are placed behind each other in the heat exchanger 74, these are designed such that the speed of the waste gas will increase as the gases pass further through the heat exchangers. From the SSH superheaters the remaining waste gases, which are still at a high temperature of approximately 400° C., pass on to one or more economizers 19,20,21. These serve to preheat the condensed steam, for example. The speed of flow here will be approximately from 5 m/sec to 15 m/sec, preferably approximately 10 m/sec, to prevent the formation of dioxins in the waste gases.

As previously stated, in the case where four SSH superheaters 15,16,17,18 are available in the heat exchanger, the steam to be heated is supplied to the fourth SSH 18, then to the third superheater 17, then to the second SSH 16, and then to the first SSH 15, from which the steam as superheated steam at a temperature of approximately 510° C. and with an increased pressure of approximately 125 bars, is extracted. It is possible to install an injection cooler 24 at the pathways between each of the SSH superheaters, by which the temperature of the steam can be regulated. By installing such an injection cooler 22,23,24 at each of the pathways from one superheater to another, good regulation of a wide range of temperatures can be guaranteed. Furthermore, it is thereby possible to accurately regulate the steam temperature in the case of unequal deposits in the various SSH bundles.

It is also possible to increase the efficiency of the installation by lowering the final exhaust temperature of the waste gases from the boiler-economizer section. However, this can cause the problem that SO3 condensation takes place in cold places wherein sulphuric acid corrosion can occur. This is especially the case with contaminated fuel that is used in waste material incinerator plants. It is therefore preferable to pass the waste gases out of the installation at a temperature from 190° C. to 230° C., these temperatures being valid for a clean boiler and a dirty boiler, respectively.

This relatively high exhaust temperature of the waste gases is an advantage for using a baghouse filter directly following the boiler (not shown). In this case, less corrosion will occur with the use of the filter and it is possible to install a Denox catalyst and a PCDD/F oxidation catalyst, if required. After passing through this baghouse filter, the waste gases will be largely free of ash, wherein it is suitable to pass the waste gases to an extra economizer (not shown), which can be used for preheating condensed steam, for example. This extra economizer is extremely efficient, because it no longer needs to cope with dust. The surface of the pipes of this economizer therefore stays a lot cleaner.

In this extra (second) economizer the temperature of the waste gases can be lowered to around 100° C. Below a temperature of 160° C. condensation of acid will generally occur. Because the condensed steam that is to be heated is at a relatively low temperature, condensation can occur in the entire second economizer. For this reason, this second economizer must be made of non-metallic, and especially non-oxidizing, material. The preference is for materials such as graphite, Teflon, and enamel.

It is also possible to use a third economizer placed after the waste gas cleaning to lower the temperature of the waste gases to around 50° C. Because the condensed steam to be heated is preferably used directly from the turbine condenser, and because it is at a temperature significantly under the dew point temperature of the waste gases, the heat that is gained here comes virtually completely from the condensation heat of the moisture in the waste gases. Because much lower concentrations of chemically aggressive materials exist at the end of the waste gas cleaning and because these are diluted by the superfluous condensation, the material requirements for this third economizer are not as extreme as those for the second economizer. The cooling of the waste gases and the condensation of the moisture lead to an extra separation as regards dust, mercury, and dioxins.

Figure 14:
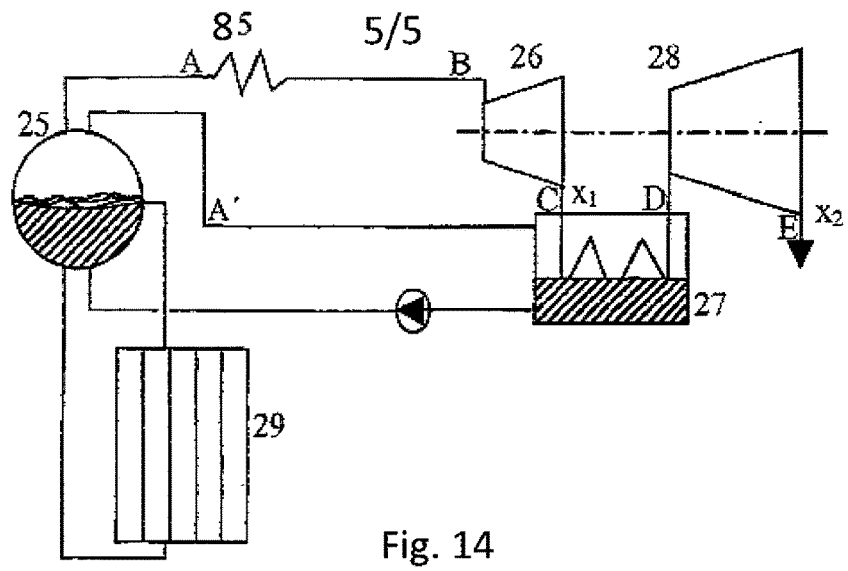
FIG. 14 shows schematics of a waste incinerator.

FIG. 14 shows schematics of a high pressure boiler which is used as a waste incinerator, wherein steam A is supplied from a steam drum 25 to the heat exchanger 85, which consists of the SSH superheaters 15,16,17,18, FIG. 13, at a pressure of $135*10^5$ kPa (135 bars), and at a temperature of 337° C. By heating up the steam A with the aid of the hot waste gases in a contraflow, steam B is extracted from the heat exchangers 85 at a temperature of 510° C. and a pressure of $125*10^5$ kPa (125 bars). This steam B is then passed to the first stage of a turbine, where it exits as steam C with a pressure of approximately $8*10^5$ kPa (8 bars) and at a temperature of approximately 180° C. Next reheating of the steam C takes place, with the aid of steam A that is taken directly from the steam drum 25. In this extra heat exchanger stage 27 the steam C is converted into steam D at a temperature of approximately 320° C., and at a pressure that is only slightly lower than after it leaves the first stage 26, namely approximately $7.5*10^5$ kPa (7.5 bars). After the second turbine stage 28 the steam E will be at a temperature from 30° C. to 60° C. and a pressure of approximately from $0.05$-$0.10*10^5$ kPa (0.05 to 0.10 bars). For the production of the steam A it is preferable to increase the temperature of the steam A, in order to increase the efficiency. For this the choice can be carefully determined, because increasing the temperature of the steam A also determines the temperature of the pipe wall in the steam superheater. By making the pipes of the superheater completely of nickel chromium alloys, or coating them with nickel chromium, it is possible to increase the temperature limit, which is usually in the range 400° C. to 430° C. For this there is of course a definite preference for supplying a very homogeneous flue gas temperature at the entry point to the steam superheater. It is possible to realize a net efficiency of more than 30% in combination with a second and third economizer. It is observed that prior art installation are typically limited to an efficiency of about 25%.

A logical consequence of a higher steam temperature is that there is also a higher steam pressure in order to obtain maximum efficiency in the turbine 26,28. This is also necessary in order to maintain manageable moisture percentages. This means that the thickness of the sides of the pipes and the parts of the boiler increases. The turbine must also be suitable for these higher temperatures and pressures. By using nickel chromium in the superheaters and the walls of the boiler, these higher temperatures and pressures are quite usable, however. In order to optimize the use of steam, reheating of the steam C after the high-pressure area in the turbine is required. This helps to prevent the steam C, D condensing into moisture percentages that are no longer manageable, during the next expansion stage. The reheating of the steam C after the first turbine stage 26 takes place using steam A' that is extracted from the steam drum 25. In the main the steam A' will be at the same temperature and pressure as steam A, seeing that this comes from the same steam drum, according to the design shown. As is generally known in technical circles, the steam drum serves to separate the mixture of water and steam that comes from the heat exchanger 29. By using this steam A' directly for reheating the steam C from the first turbine stage one can achieve a great amount of freedom for the design of the boiler. The thermal charge of the membrane walls 29 (the evaporators in the radiation area can especially be enlarged, without this being dependent on the superheaters (steam superheater in the convection area). This means that on the side where the flue gas is the variation of the temperature can be optimally chosen. The extra capacity that is especially obtained from the membrane wall 29 through the reheating decreases the thermal capacity that is supplied by the superheater. The temperature of the flue gas for the steam superheater can be set relatively low using these measures, namely a flue gas temperature lower than 750° C., preferably lower than 720° C., more preferably from 600° C. to 680° C., namely from 600° C. to 650° C. The high flue gas temperatures that are necessary for a high thermal capacity in the superheater generally result in problems because they increase the corrosion and the growth of fly ash. Using these measures therefore means that these drawbacks no longer occur.

Other advantages of this construction are that the steam moisture percentages, shown in FIG. 14 with the annotations x1 and x2 for the first and second turbine stage 26,28, respectively, can be freely chosen. The average process temperature of the water-steam cycle, and therefore the efficiency of the turbine, is thereby as high as possible, at any chosen maximum steam temperature.

It is now possible to regulate the maximum steam temperature at a lower value without x2 becoming extremely high. The other way round is also possible.

Furthermore the possibility of erosion of the turbine blades decreases considerably because of the lower moisture percentages.

Corrosion resistance of nickel chromium alloys is found to depend on the surface temperature of the cladding and of the flue gas temperature. Because the corrosion resistance of nickel chromium alloys is considerably less at flue gas temperatures of 650° C. to 700° C. and more, it is preferable not to let the temperature of the pipes, and the other parts of the installation which come into contact with higher temperatures, rise to more than from 600° C. to 650° C. For the membrane wall near the furnace the flue gas temperatures can be influenced by mixing the flue gases with air or recirculated flue gases. But even then, the temperatures of the flue gas may be considerably above these preferred temperatures. The surface temperature is amongst others determined by the pressure in the tubes, which in turn determine the boiling temperature of the water. The good heat conductivity of the steel and cladding result in a cladding surface temperature of only about 5-30° C. above the water temperature. This is found to be determined by the heat flux which is dependent of the heat radiation in the furnace and the thickness of the layer of fly ash deposits on the surface. Higher design pressures for boilers are preferred because this is favorable for the thermodynamic efficiency of the production of electricity. There appears to be some correlation of the corrosion of the Inconel with the pressure and hence temperature of the water in the membrane wall. This correlation is however not one-to-one. Many installations with boiler pressures with only 30-40 bar boiler pressure have parts with more corrosion than what is found in some installations operating at 80-140 bar boiler pressure. No clear mechanism explaining the differences has yet been found. This patent describes measures that after years of experimenting have been found to work favorably on the reduction of the cladding corrosion.

The measures described above are especially suitable for improving the efficiency of a waste incinerator with regard to the generation of electricity. The highest preference is for the combination of steam heating to a temperature of at least 450° C. at a pressure of $70*10^5$ kPa (70 bars), or preferably a temperature of at least 480° C. and a pressure of at least $100*10^5$ kPa (100 bars), and even more preferably a temperature of approximately 500° C. and a pressure of at least $120*10^5$ kPa (120 bars), as well as a decrease of the flue gas flow in the passage to less than 5 m/sec, preferably from 3 m/sec to 4 m/sec, and a flue gas flow through the heat exchanger at the entrance of less than or equal to 5 m/sec and at the exit from 5 m/sec to 12 m/sec, with the use of a contraflow in the heat exchanger, and wherein the flue gases are at a temperature of less than 750° C., and preferably less than 690° C., at the point they are passed to the heat exchanger.

According to the invention improved efficiency will be achieved. Hereby it is possible to achieve an eventual efficiency in steam production of at least 29% gross/26% net, or even better at least 33% gross/30% net, or ultimately 36% gross/33% net, if a method described in the invention described here is combined with a method described in the patent applications from the same inventors that are submitted at the same time as this patent application.

Figure 15:
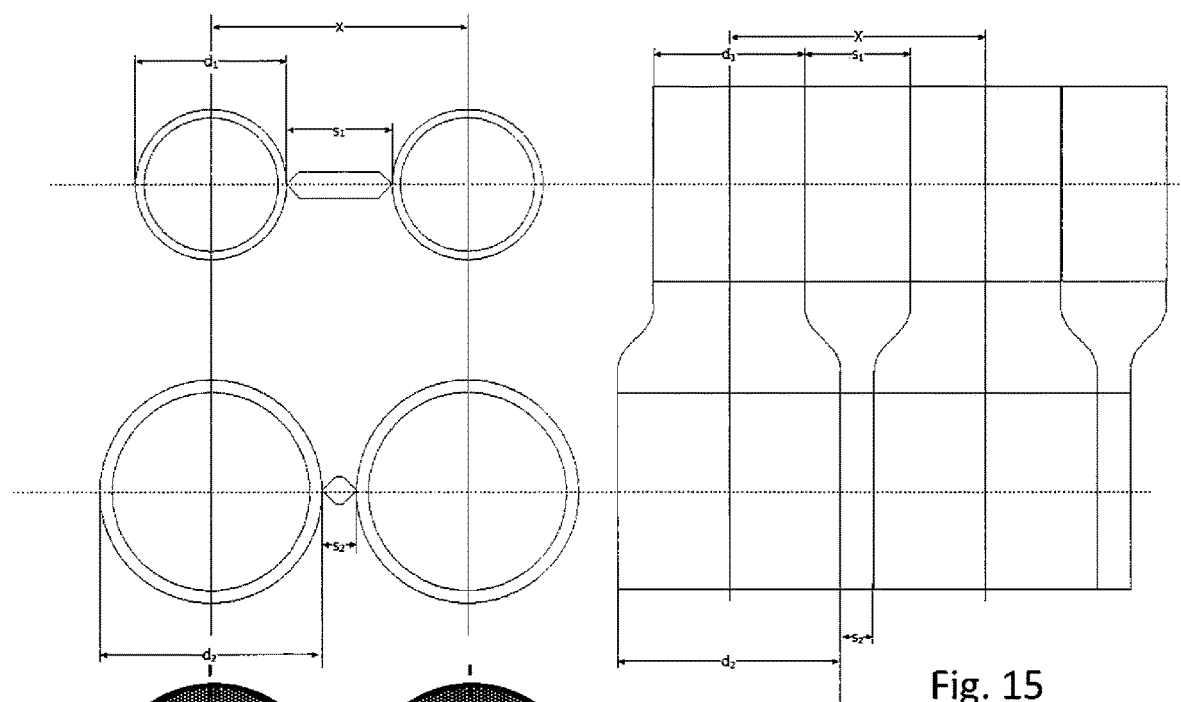
FIG. 15-16 show details of an exemplary membrane panel.

FIG. 15 shows details of an exemplary membrane panel. An objective is to provide a design of a membrane wall for a high corrosive area in the first pass of the HR-boiler near the hottest area of the furnace. The membrane wall is made from tubes with diameter d and strips with width s, leading to a regular heart distance X from tube to tube. In areas with normally corrosive areas, a standard tube diameter $d_1$ may be used and a bigger strip width $s_1$. In the highly corrosive area, the strip width is minimized in order to ensure maximum cooling on the strip surface. This is achieved by applying a high tube diameter $d_2$ and a small strip width $s_2$. The transition from the $s_1$-$d_1$-panel section to the $s_2$-$d_2$-panel section is realized by the means of adaptors, whereas the hart distance is constant ($X=s_1+d_1=s_2+d_2$). The standard membrane wall parameters $s_1$ and $d_1$ will be determined by standard boiler design procedures, while the high corrosive area parameter $s_2$ and $d_2$ are determined by the minimum achievable strip width $s_2$.

Figure 16:
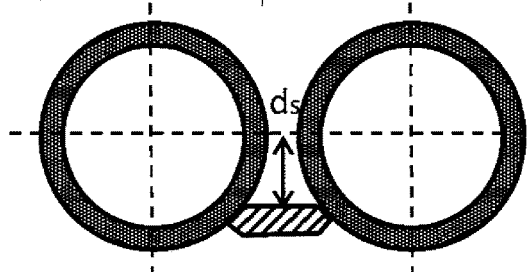

In a further variant of an exemplary membrane panel in FIG. 16, comparable to FIG. 15, the strip is placed more to the front of the pipes, typically at a distance $d_s$ with respect to a common centre-line of two adjacent tubes of 2-30% of a diameter of the tubes, preferably at $d_s$ 5-20% such as 7-17%, e.g. 10-12%. This embodiment is not aimed at conventional reduction of surface temperature in the strip, but is aimed at creating a more flat panel. This is found to limit adherence of fly ash deposits. This panel reduces the lifetime of the fly ash deposits on the wall and reduces the thickness of the deposits, especially for the thickness from strip-surface to the surface of the fly ash facing the hot flue gases. It is noted that in the layer of fly ashes there may be a mixture of many different salts of for example metals and anions. These salts have different melting points and different vapor pressure. Some of these salts have melting points even below 250° C. and will remain liquid even at the coldest spots near the surface of the tubes. Especially the aggressive chlorine salts can accumulate by diffusion driven by the temperature difference between fly-ash surface and NiCr surface. This molten salt droplets can than over prolonged time induce corrosion on the cladding. Inventors found that by reducing differences in temperature profiles the diffusion of species is less pronounced and that on this basis the formation of liquid eutectics at the surface of the cladding is reduced. Secondly the growth of the salt eutectics is reduced by the above described reduction of the lifetime of the deposits on the wall.

Further it is preferred to avoid oxygen-free pockets at the surface of the cladding. In order to be corrosion resistant the cladding preferably has a protective layer, such as an oxide layer, on its surface. This oxide layer is highly resistant, even to the molten salt eutectics at the local temperature of 250-350° C. It is found that once this oxide layer is compromised corrosion takes place relatively quickly creating pockets in the bare cladding metal surface. Extensive observations of the surface of the cladding led to the conclusion that an initial vulnerability of the cladding in view of the salt eutectics is improved by having a flatter surface, and that the self-healing of cladding by re-oxidization is improved. This re-oxidization may be considered as an important step, requiring a minimum of oxygen that by diffusion through the fly ash layer is typically available at the cladding surface. This re-oxidation is significantly promoted by reducing the lifetime of the deposits on the wall. These new insights lead to the use of flatter panel constructions as well as to a preference for a smoother weld-surface by better weld technologies or post-weld treatment. A flat panel construction combined with a smooth weld surface is therefore preferred. The above may be considered a teaching applicable to all exemplary embodiments and the invention in general.

The boiler wall typically consists of a number of membrane wall panels and the boiler water fed into and collected from the boiler wall at the bottom and the top of the wall by means of headers. For the connection of the membrane wall to the headers a minimum strip width s is required for appropriate welding. The highly corrosive area is in the mid part of the boiler wall, such that standard panels are placed above it and under it. In this way, the minimum achievable strip width is not influenced by the panel-to-header welding requirements.

EXAMPLES

For applying a cladding to the present panel the following method may be used.

First a to be cladded membrane panel is provided. The panel has at least one curvature on its surface and comprises at least one hollow segment. Thereafter a cladding is provided to the surface by welding. It has been found that in order to obtain a cladding that can withstand the high temperature and high pressure used in the present incinerator over time special precautions have to be taken. Thereto the surface of the membrane panel is preferably well cleaned by grinding and/or chemical etching. It is preferably actively cooled to a temperature below 323 K, preferably below 305 K. It is preferred that during welding strikes and weld spatters are removed, such as by grinding and/or polishing. For good results welding is performed under an inert atmosphere, with <800 ppm $CO_2$, preferably <600 ppm $CO_2$, with <500 ppm $O_2$, preferably <350 ppm $O_2$, the atmosphere preferably comprising 5-90% He, 0-3% $H_2$, 0-10% $N_2$, and the remainder Ar, such as a Cronigon-Ni-10/20/30 atmosphere (according to DIN EN ISO 14175:Z). During welding cooling is preferably provided, such as by circulating a coolant through the panel wall, preferably water. The panel wall is preferably 99-100% filled with coolant, preferably 99.5-100%, more preferably 99.9-100%. In order to obtain a durable cladding the surface of the layer to be overlay welded is preferably cleaned by at least one of grinding, such as by using glass pearls, wet chemical etching. The surface is preferably cleaned twice, in a first step by grinding and in a second step by using glass pearls (DIN 25410).

For cladding curved surface parts the following method is preferably followed. Therein (a) a first cladding is provided on a first side of the curvature, a second cladding is provided on a side opposite to the first side, a third cladding is provided on a top side of the curvature, and (b) further claddings are provided on the first and second cladding respectively. It is important that the further cladding overlaps the first or second cladding by >40%, preferably >50%, such as >60%, respectively. In the method (c) step (a) is repeated until a full coverage of the curvature is reached. In complex structures with adjacent curvatures steps (a)-(c) are repeated for the adjacent curvatures.

It should be appreciated that for commercial application it may be preferable to use one or more variations of the present system, which would similar be to the ones disclosed in the present application and are within the spirit of the invention.

The invention claimed is:

1. A high pressure and high efficiency heating incineration installation comprising at least one membrane panel,
   wherein a material of the panel is selected from steel alloys, comprising 0.002-3 wt. % C, and at least one further metal selected from Mo, Mn, B, Ti, V, Nb, Cr, Al, Cu, Si, Co, W, and Ni, in an amount of total further metal of 0-10 wt. %,
   wherein the installation is adapted to operate at a water-steam pressure from $3*10^3$ kPa-$3*10^4$ kPa and at a flue gas temperature of 850-1650 K,
   wherein the membrane panel comprises at least one tube, and a NiCr alloy cladding, wherein the NiCr alloy comprises
   >35 atom % Ni, >18 atom % Cr, 0-6 atom % Fe, <19 atom % Mo, 0.1-5 atom % Nb+Ta, and 0-10 atom % of at least one of C, Mn, Si, P, S, Al, Ti, W, Cu, and Co,
   wherein the cladding has a surface roughness Ra of ≤60 μm, a surface purity SA of ≥2.0, and a thickness of 1.5-10 mm over at least 50% of the cladded area.

2. The high pressure and high efficiency heating incineration installation according to claim 1, wherein the cladding comprises 37-67 atom % Ni, 18-33 atom % Cr, 0-5 atom % Fe, 1-17 atom % Mo, 1-5 atom % Nb+Ta, and 0-5 atom % of at least one of C, Mn, Si, P, S, Al, Ti, W, Cu, and Co.

3. The high pressure and high efficiency heating incineration installation according to claim 2, wherein a strip between two tubes has a width $s_2$ of 3-50 mm, and wherein a strip width $s_1$ of membrane panel closest to the hottest part of the furnace is 1-35 mm, and wherein a tube diameter $d_2$ is 30-147 mm, and wherein a tube diameter $d_1$ closest to the hottest part of the furnace is 20-149 mm, and wherein a sum of the strip width and the tube width $s_{1,2}+w_{1,2}$=20-150 mm.

4. The high pressure and high efficiency heating incineration installation according to claim 2, comprising an incinerator, adjacent to the incinerator a first area with refractory coated walls.

5. The high pressure and high efficiency heating incineration installation according to claim 2, wherein a strip comprises tapered sides at a longitudinal direction thereof.

6. The high pressure and high efficiency heating incineration installation according to claim 1, wherein a longitudinal curvature of a membrane panel is <10 mm/3000 mm, and wherein a longitudinal curvature of a strip is <1 mm/1000 mm.

7. The high pressure and high efficiency heating incineration installation according to claim 1, wherein a weld comprises <10 wt. % Fe as determined by spectral analysis PMI.

8. The high pressure and high efficiency heating incineration installation according to claim 1, having at least one flat wall.

9. The high pressure heating and high efficiency heating incineration installation according to claim 1, wherein the tube has a diameter of 1-10 cm, and a variation in diameter over an angle of 90° is less than 2%, relative to the diameter.

10. The high pressure and high efficiency heating incineration installation according to claim 9, wherein over a longitudinal direction of the membrane the at least one membrane tube has a variation in diameter of <1% relative to an average diameter.

11. The high pressure and high efficiency heating incineration installation according to claim 1, comprising at least two parallel tubes coupled to a plate element, wherein the tube and plate element are thermally coupled, and wherein the plate element faces hot gases when in operation.

12. The high pressure and high efficiency heating incineration installation according to claim 11, wherein a space between tubes is filled with a thermal conducting material.

13. The high pressure and high efficiency heating incineration installation according to claim 1, wherein a variation in width of the membrane panel is <2 mm/m length with a maximum of 10 mm, and wherein a variation in length of the membrane panel is <2 mm/m width with a maximum of 10 mm, and wherein a curvature over a longitudinal direction of the membrane panel is <6 mm/m.

14. The high pressure and high efficiency heating incineration installation according to claim 1, wherein a width of the panel is from 20-1200 cm, and a length is from 20-2500 cm, and wherein at least one rear side support to the panel is provided.

15. The high pressure and high efficiency heating incineration installation according to claim 1, wherein a wall thickness of the panel is from 5-20 cm.

16. The high pressure and high efficiency heating incineration installation according to claim 1, wherein the cladding comprises a protective layer.

17. The high pressure and high efficiency heating incineration installation according to claim 1, comprising at least one of a steam drum, a steam flow A to a heat exchanger generating steam flow B, the heat exchanger comprising at least one superheater, a contra-steam flow A' for additional heating of the steam flow, a passage for steam B to first stage of a turbine, the turbine comprising an exit for steam C, a reheater for steam C using steam A, a heat exchanger stage generating a steam flow D, a second turbine stage generating steam flow E, the steam drum adapted to separate a mixture of water and steam and being in fluid contact with the heat exchanger, the heat exchanger comprising at least one membrane panel, a first pass rising vertically in fluidic contact with a second pass declining vertically, the second pass being in fluidic contact with a third pass rising vertically towards the heat exchanger, the third pass oriented at an angle α from 30° to 70°, an evaporation wall, at least one evaporation pipe, a small open space, an injection cooler in upstream fluidic contact with a first superheater and downstream fluidic contact with a second superheater, and an economizer in downstream fluidic contact with a superheater.

18. A membrane panel for a heating incineration installation,
   wherein a material of the panel is selected from steel alloys, comprising 0.02-3 wt. % C, and at least one further metal selected from Mb, Mn, B, Ti, V, Nb, Cr, Al, Cu, Si, Co, W, and Ni, in an amount of total further metal of 0-10 wt. %,
   wherein the membrane is adapted to operate at a pressure from $3*10^3$ kPa-$3*10^4$ kPa and at a temperature of 850-1650 K,
   wherein the membrane panel comprises at least one tube, and a NiCr alloy cladding, wherein the NiCr alloy comprises >35 atom % Ni, >18 atom % Cr, 0-6 atom % Fe, <19 atom % Mo, 0.1-5 atom % Nb+Ta, and 0-10 atom % of at least one of C, Mn, Si, P, S, Al, Ti, W, Cu, and Co, wherein the cladding has a surface roughness Ra of <60 µm, a surface purity SA of ≥2.0, and a thickness of 1.5-10 mm over at least 50% of the cladded area.

19. The membrane panel for a heating incineration installation according to claim 18, wherein a strip width of the panel increases from one membrane section to another membrane section, and wherein a strip is provided in between two tubes at a distance $d_s$ with respect to a common centre-line of two adjacent tubes of 2-30% of a diameter of the tubes.

* * * * *